Patented Apr. 4, 1944

2,345,711

UNITED STATES PATENT OFFICE 2,345,711

STEROL COMPOUND AND METHOD OF OBTAINING THE SAME

Russell Earl Marker, State College, Pa., assignor to Parke, Davis & Company, Detroit, Mich., a corporation of Michigan No Drawing. Application September 30, 1940, Serial No. 359,163

4 Claims. (Cl. 260—397.3)

The invention relates to a new class of sterol compounds which may be considered as derivatives of the urane series in which the ring system is unsaturated. More particularly, the invention relates to the preparation of compounds which may be represented by the following structural formula

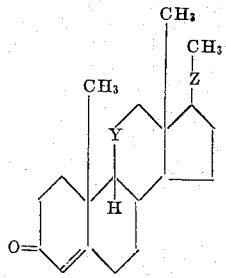

where Y and Z represent the same or different members of the class consisting of

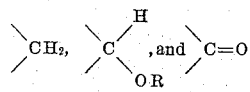

R being H or acyl. Such compounds may be obtained synthetically from the corresponding uraneol, uranediol, and uranetriol compounds, some of which are described in my copending applications, Serial No. 183,137, filed January 3, 1938, and Serial No. 227,428, filed August 29, 1938. This application is a continuation-in-part of my copending application, Serial No. 183,137 above mentioned.

My invention also relates to the preparation of certain intermediate compounds which may be described generally as the halogenouraneone-3 compounds, particularly those in which the halogeno group is substituted at $C_2$ or $C_4$.

In the preferred method of synthesis, the new group of urene compounds are prepared by first halogenating the uraneone-3 compound and then eliminating hydrogen halide, thus forming a double bond in ring A.

As set forth in my copending applications above referred to, urane is considered as being isomeric with pregnane in having a different configuration at the No. 9 carbon atom. The same relationship holds true with the urane derivatives herein described. See further Marker et al. J. Am. Chem. Soc. 60, 1061 (1938).

The following examples are illustrations of the present invention.

Example 1

(a) Uranetrione-3,11,20 is obtainable by isolation from oxidized carbinol fractions from pregnancy urine, or may be made synthetically from uranetriol. Examples of the preparation of uranetrione are set forth in my copending application, Serial No. 183,137. In obtaining some of the compounds of the present invention, uranetrione-3,11,20 may be used as a starting material.

A solution of 2 grams of uranetrione in 60 cc. of glacial acetic acid is cooled to 20° C. while adding dropwise 6.2 cc. of a 1.05 molar solution of bromide in acetic acid. The bromide is absorbed at once and hydrogen bromide is eliminated. After the reaction mixture has stood for 20 minutes, 200 cc. of water is slowly added to the acetic acid solution with shaking. A white precipitate appears which is filtered off and washed repeatedly with water. The substance is dried at 80° C. for 4 hours, after which the weight is found to be 2.3 grams and the melting point 183° C. Crystallization of the product from ethyl alcohol gives pure bromo-uranetrione melting at 204° C.

This compound has the composition $C_{21}H_{29}BrO_3$ and may be represented by the formula,

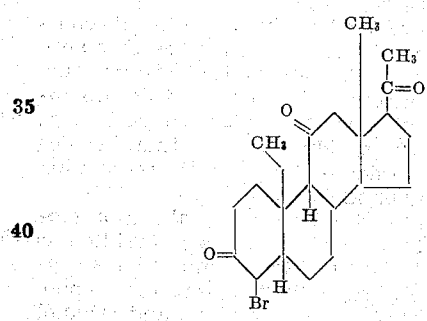

4-bromo-uranetrione-3,11,20

(b) A solution of 1.6 grams of bromo-uranetrione in 17 cc. of dry pyridine is boiled 3½ hours under a reflux condenser. At the end of this time the solution is poured into an excess of dilute sulfuric acid and the solid which separates is extracted with ether. The ethereal solution is washed with water and evaporates to dryness. The brownish solid is taken up in alcohol, clarified by treating with boneblack, filtered, and the product crystallized from the filtrate to give crystals melting at 196° C.

Crystals of an apparently allomorphic form of urenetrione melting at 212° C. can be isolated from the mother liquors after separating out the trione melting at 196° C.

Both of the allomorphic forms of urenetrione mentioned above may be represented by the following structural formula,

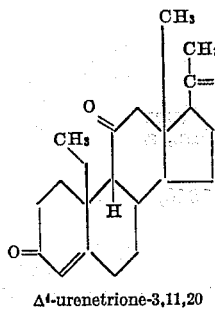

Δ⁴-urenetrione-3,11,20

Example 2

(a) In my copending application, Serial No. 227,428, the preparation of uranedione-3,11 is described.

To a solution of 2 g. of uranedione-3,11 in 40 cc. of acetic acid acidified with 3 drops of 48% hydrobromic acid is added 6.3 cc. of 1.05 M bromine in acetic acid. White crystals separate toward the end of the reaction. The reaction mixture is diluted carefully with water and the crystalline solid collected, washed and crystallized from ether to give compact white crystals, M. P. 202-203° C.

This compound is thought to have the formula

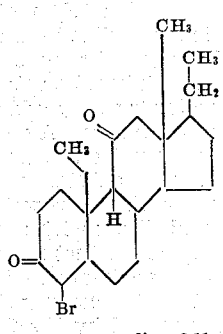

Bromo-uranedione-3,11

The position of the bromine atom in this compound is thought to be at C₄, as indicated above. However, there is a possibility that the bromine atom may be attached to C₂ since this bromo-uranedione requires more drastic treatment (i. e., distillation of the pyridinium salt) than bromo-uranetrione in order to form the corresponding urenone-3 compound.

(b) A mixture of 1.7 g. of the above bromo-uranedione-3,11 and 45 cc. of dry pyridine is refluxed for 3½ hours. Small white plates separate shortly after the refluxing is started. These are collected, washed with pyridine and ethanol and dried. This product is the pyridinium bromide salt of bromouranedione-3,11. It does not melt below 300° C.; the yield is 1.5 g.

1.4 g. of the pyridinium salt is placed in a glass retort and heated at 5-10 mm. pressure until no more material distills over. The reaction product is sublimed in high vacuum at 90-110° C. The sublimate is taken up in ether and the pyridine salt removed by washing with dilute hydrochloric acid in water. The ether is evaporated and the product crystallized from aqueous acetone as white needles. The product has a melting point of 168-170° C.

This compound has the following structural formula

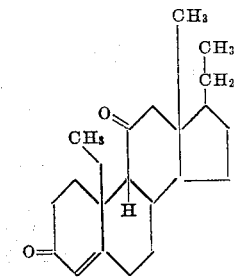

Δ⁴-urenedione-3,11

Example 3

(a) Uranone-3-ol-11 is prepared, as for example, according to the directions of Marker and Rohrmann, J. A. C. S. 61, 2719 (1939).

To a solution of 2 grams of uranone-3-ol-11 in 10 cc. of carbon tetrachloride a solution of 1 g. of bromine in 10 cc. of carbon tetrachloride is slowly added. After standing for 15 minutes the solvent is completely evaporated in vacuo. The residue which remains behind is the alpha bromo ketone, bromouranone-3-ol-11. If desired, it may be purified further by crystallization from a mixture of benzene and petroleum ether.

If a solution of chlorine (0.4 g.) in carbon tetrachloride (10 cc.) is substituted for the bromine in carbon tetrachloride, the corresponding chlorouranone-3-ol-11 is obtained. This may be substituted for bromouranone-3-ol-11 in the example below.

(b) The total amount of bromouranone-3-ol-11 obtained above is dissolved in 20 cc. of collidine or dimethyl aniline or similar high boiling tertiary amine, and refluxed for 2 hours. Then the dark solution is poured into dilute hydrochloric acid, extracted with ether and the ethereal extract washed well with water. After evaporating the ether, the residue is crystallized from a mixture of ether and pentane. As thus obtained, the product, Δ⁴-urenone-3-ol-11 is a white crystalline compound readily soluble in alcohol and most organic solvents.

In this example, instead of using uranone-3-ol-11, its esters such as its acetate, butyrate, or benzoate may likewise be used. Thus, there is obtained Δ⁴-urenone-3-ol-11 acetate, Δ⁴-urenone-3-ol-11 butyrate, Δ⁴-urenone-3-ol-11 benzoate, etc.

Example 4

(a) Uranone-3-diol-11,20 diacetate is prepared as for example by partially hydrolyzing uranetriol triacetate-3, 11,20 to obtain uranetriol diacetate-11,20 and oxidizing it with chromic acid to uranone-3-diol-11,20 diacetate.

To 1.25 grams of uranone-3-diol-11,20 diacetate in 10 cc. of chloroform is slowly added 3 cc. of a 1.05 molar solution of chlorine in chloroform. After standing for 15 minutes, the mixture is evaporated to dryness in vacuo. The residue of the alpha chloroketone, chlorouranone-3-diol-11,20 diacetate, may be further purified by crystallization from acetic acid. This, however, is not essential for the next preparation.

(b) Chlorouranone-3-diol-11,20 diacetate, obtained for instance as described above, is refluxed fror 2 hours with 15 times its weight of dry pyridine. Then the mixture is poured into dilute sulfuric acid and the precipitated product collected and washed well with water. This product, which is $\Delta^4$-urenone-3-diol-11,20 diacetate may be crystallized from diluted alcohol or from acetic acid-pentane and is thus obtained in the form of white crystals.

In this example, instead of using the diacetate of uranone-3-diol-11,20 or some other ester such as butyrate, the free diol may be used.

*Example 5*

(a) Uranediol-3,11 may be obtained as described by Marker, Rhormann and Wittle, J. Am. Chem. Soc. 60, 1561 (1938). One gram of uranediol-3,11 is dissolved in 20 cc. of acetic acid and 0.3 cc. of acetic anhydride added. The mixture is refluxed for one-half hour and then evaporated to dryness in vacuo. To the residue is added 2 cc. of thionyl chloride and the mixture is set aside overnight. The next day the mixture is evaporated on a steam bath leaving a residue of 11-chloro-uranol-3-acetate. This residue is dissolved in 20 cc. of methanol, 1 gram of potassium bicarbonate added and the mixture refluxed for an hour. Then it is diluted with water and extracted with ether. The ethereal extract is washed with water and evaporated to dryness. The residual 11-chloro-uranol-3 is freed of traces of water by dissolving it in 20 cc. of benzene and again evaporating to dryness. This residue is now dissolved in 10 cc. of pyridine, 1.5 grams of phthalic anhydride is added and the mixture warmed for an hour on the steam bath. Then the mixture is poured into water, extracted with ether and the ethereal extract washed successively with water, dilute sulfuric acid and water again. Now this ethereal solution is extracted ith 2% sodium carbonate solution several times. The combined sodium carbonate extracts are acidified and extracted with ether. This ethereal solution is evaporated to dryness and then the residue hydrolyzed by warming it on a steam bath for half an hour with 1% methanolic potassium hydroxide. This mixture is diluted with water, extracted with ether and the ethereal solution washed with water and evaporated to dryness. The residue is substantially pure 11-chloro-uranol-3. It may be further purified if desired by crystallization from ethanol or dilute methanol.

(b) To a solution of 0.5 gram of 11-chloro-uranol-3 in 20 cc. of boiling n-butyl alcohol is added in small pieces and over aperiod of about ½ hour, 3 grams of metallic sodium. The solution is refluxed an additional hour, cooled and neutralized by the addition of dilute aqueous hydrochloric acid. The butanol and aqueous layers are separated and the aqueous layer is extracted once with ether. This ethereal extract is added to the butanol layer and the whole is washed once with water. The butanol-ether extract is then evaporated on a steam bath, first at ordinary pressure and finally in vacuo. The residue is uranol-3. It may be purified further by the use of half phthalate separation as in part A and by molecular distillation or crystallization from methanol.

(c) To a solution of 0.4 gram of uranol-3 in 10 cc. of acetic acid is added a solution of 200 mgms. of chromic anhydride in 5 cc. of 90% acetic acid. After standing for an hour at room temperature, the mixture is concentrated to a small volume in vacuo, diluted with water and extracted with ether. The ethereal extract is washed with dilute hydrochloric acid, dried and evaporated to dryness. The uranone-3 which remains may be purified by crystallization from dilute ethanol or methanol and is thus obtained in the form of pure white crystals.

(d) 200 mgms. of uranone-3 is dissolved in 5 cc. of acetic acid and a solution of 1.05 molar bromine in acetic acid, corresponding to slightly more than 1 molecular equivalent of the ketone is added. After standing for 20 minutes, the reaction is practically complete and the solution may be diluted with water and extracted with ether to isolate the α-bromoketone, bromo-uranone-3. Evaporation of the ethereal extract leaves this desired bromo-ketone in a somewhat impure form. It is purified by crystallization from slightly diluted acetone and is thus obtained in the form of white crystals which show some tendency to decompose on melting.

(e) A solution of 200 mgms. of bromo-uranone-3 is refluxed with 3 cc. of colidine for 2 hours. Then the mixture is poured into ether and dilute hydrochloric acid and the layers separated. The ethereal layer is washed with dilute hydrochloric acid and water, dried and evaporated. The residue is purified by crystallization from dilute alcohol and thus yields $\Delta^4$-urenone-3 in the form of a pure white crystalline powder. This compound forms a red 2,4-dinitrophenyl hydrazone.

*Example 6*

(a) To 5 grams of uranetrione-3,11,20 in 200 cc. of acetic acid is added 0.2 gram of Adam's platinum oxide catalyst. The mixture is shaken in a hydrogenator at 30 lbs. pressure until 2 mols of hydrogen have been absorbed. The solution is filtered from catalyst, 3 cc. of acetic anhydride added and the solution boiled for 4 hours. Then 10 cc. of methanol is added to destroy the excess acetic anhydride and the solution mixed with 5 grams of Adam's platinum oxide catalyst and again hydrogenated for a longer period of time until 1 mol of hydrogen has been absorbed. The mixture is filtered from the catalyst and the residue carefully evaporated to dryness in vacuo. To this residue is added 10 cc. of thionyl chloride and the mixture allowed to stand overnight. Then the thionyl chloride is evaporated on the steam bath, and the residue hydrolyzed by warming it with 2 grams of potassium hydroxide in 200 cc. of methanol for ½ hour. The mixture is poured into water, extracted with ether and the ethereal layer washed with water, dried and evaporated. This residue is dissolved in 100 cc. of hot amyl alcohol and 10 grams of sodium added over a period of ¾ hour. After refluxing for a short time longer, the solution is cooled, poured into dilute hydrochloric acid and the layers separated. The water layer is extracted once with ether and this ethereal extract added to the amyl alcohol layer. The whole is washed with dilute hydrochloric acid and water and evaporated on the steam bath, at first at atmospheric pressure and finally in vacuo. To the residue is added 75 cc. of acetic acid and the solution is again carefully evaporated to dryness in vacuo. Now the residue is dissolved in 100 cc. of acetic acid and a solution of 3 grams of chromic anhydride in 40 cc. of 90% acetic acid slowly added over a period of 15 minutes. The excess chromic anhydride is destroyed by the addition of methanol and the solution concentrated to a small volume in vacuo. This mixture is diluted with water and ether, the layers separated and the ethereal extract washed with dilute hydrochloric acid and water. Then the ethereal solution is evaporated to dryness. The residue is chiefly uranedione-3,20 and it is best purified by crystallization from benzene-ligroin.

(b) To a solution of 1 gram of uranedione-3.20 in 20 cc. of acetic acid is added one molecular equivalent of a 5% solution of chlorine in chloroform. After the mixture has stood for 20 mintues it is carefully evaporated to dryness in vacuo taking care that the bath temperature does not exceed 45°. There remains a residue of chlorouranedione-3,20 which may be crystallized from methanol.

(c) 0.3 gram of chlorouranedione, prepared for example as described in Example 11, is refluxed gently for an hour with 5 cc. of quinoline. Then the mixture is poured into dilute hydrochloric acid and extracted with ether. The ethereal extract is washed with dilute hydrochloric acid and water and evaporated to dryness. The residue is crystallized from benzene-ligroin and $\Delta^4$-urenedione-3,20 is thus obtained in pure crystalline form.

*Example 7*

(a) 1 gram of uranedione-3,20 obtained for example as in part a of Example 11, is dissolved in 100 cc. of acetic acid and 20 cc. of acetic anhydride. Then 1 gram of Adam's platinum oxide catalyst is added and the mixture shaken at 45 lbs. hydrogen pressure for about an hour, or until 2 mols hydrogen have been absorbed. The mixture is freed of catalyst by filtration and the solution is refluxed for an hour in order to complete the acetylation of the product. Then the solvents are removed in vacuo, and the residue crystallized from dilute alcohol or methanol to give pure uranediol-3,20 diacetate.

(b) 1 gram of the above uranediol-3,20 diacetate is refluxed for 1 hour with 200 cc. of methanol and 1 gram of potassium bicarbonate. Then the mixture is neutralized with hydrochloric acid and carefully concentrated to a small volume in vacuo. Ether and water are added and the layers separated. The ethereal layer is washed with water and evaporated to dryness. The residue is dissolved in 20 cc. of acetic acid and a solution of 1 gram of chromic anhydride in 10 cc. of 90% acetic acid is added. After an hour a few cc. of methanol are added and then the solution is concentrated in vacuo. The residue is diluted with ether and dilute aqueous hydrochloric acid and the layers separated. The ethereal layer is washed with dilute hydrochloric acid and water and evaporated to dryness. Then 20 cc. of alcohol and 0.5 gram of potassium hydroxide are added and the mixture is warmed for ½ hour. After cooling, the mixture is poured into water and extracted with ether. The ethereal extract on evaporation leaves a residue of somewhat impure uranone-3-ol-20. This may be purified by crystallization from benzene-ligroin.

(c) To a solution of 400 mgms. of uranone-3-ol-20 is added 1 molecular equivalent of bromine in the form of a 1.05 molar solution of bromine in acetic acid. After the mixture has stood for ½ hour, it is diluted with water and extracted with ether. The ethereal extract is washed successively with water, dilute sodium bisulfite solution and water and then evaporated to dryness taking care that the residue is not heated much above 45°. This residue is bromouranone-3-ol-20 and it may be purified by crystallization from dilute alcohol or methanol.

Instead of using uranone-3-ol-20 in this example, its esters such as uranone-3-ol-20 acetate, or uranone-3-ol-20 benzoate may also be employed.

(d) 500 mgms. of bromouranone-3-ol-20 is refluxed with 3 cc. of pyridine for 3 hours. Then the mixture is poured into dilute hydrochloric acid and extracted with ether. The ethereal extract is washed with dilute hydrochloric acid and water and evaporated to dryness. The residual $\Delta^4$-urenone-3-ol-20 may be purified further by sublimation in a high vacuum. As thus obtained, it forms pure white crystals. It gives a red 2,4-dinitrophenyl hydrazone.

*Example 8*

(a) Uranetriol-3,11,20 may be obtained as set forth in my copending application Serial No. 183,137 and described also by Marker et al. in J. Am. Chem. Soc. 60, 1061 (1938). 3 grams of uranetriol is heated with 20 grams of pyridine and 6 grams of phthalic anhydride for 2 hours. Then the mixture is poured into water and extracted with ether. The ethereal extract is washed with dilute hydrochloric acid and with water and then extracted with 2% sodium carbonate solution. The combined sodium carbonate extracts are acidified and extracted with ether. The ethereal extract is evaporated to dryness. This residue is the 3,20-di-half phthalate ester of uranetriol.

The residue is dissolved in 300 cc. of methanol, 4 grams of potassium bicarbonate added and the mixture refluxed for an hour. Then it is carefully neutralized with strong hydrochloric acid, concentrated to a small volume, diluted with water and extracted with ether. The ethereal extract is evaporated to dryness, dissolved in 100 cc. of acetic acid and a solution of 2 grams of chromic anhydride in 25 cc. of 90% acetic acid added and the mixture set aside for an hour. Then methanol is added and the solution concentrated in vacuo. The residue is diluted with water and ether, the layers separated and the ethereal layer washed with dilute hydrochloric acid and water and then evaporated to dryness. The residue is hydrolyzed by heating it with 200 cc. of 2% methanolic potassium hydroxide. The hydrolyzed mixture is poured into water, extracted with ether and the ethereal extract evaporated to dryness. The residue of uranedione-3-ol-20 is further purified by crystallization from dilute alcohol or methanol.

(b) To a solution of 500 mgms. of uranedione-3-11-ol-20 in 20 cc. of acetic acid is added slightly more than 1 molecular equivalent of a 1.05 molar solution of bromine in acetic acid. After ½ hour the mixture is diluted with water and extracted with ether. The ethereal extract is washed with water, dilute sodium bisulfite solution and water and then the ether is removed on the steam bath. The bromouranedione-3,11-ol-20 thus obtained is purified by crystallization from dilute alcohol or methanol and is thus obtained in the form of white crystals.

(c) A solution of 200 mgms. of bromouranedione-3,11-ol-20 in 5 cc. of dimethylaniline is refluxed for an hour. Then the mixture is poured into dilute hydrochloric acid solution and extracted with ether. The ethereal extract is washed with dilute hydrochloric acid and water and evaporated to dryness. The residue is purified by solution in benzene-ligroin and filtration through a tower of alumina and the filtrate allowed to crystallize. The $\Delta^4$-urenedione-3-11-ol- 20 is thus obtained in the form of white crystals which give a bright red 2,4-dinitrophenyl hydrazone.

As the foregoing examples show, my invention consists essentially in mono-halogenating, preferably mono-brominating or mono-chlorinating, a uranone-3 compound, separating the mono-halogenated uranone-3 compound, treating this with a reagent capable of removing hydrohalic acid, and separating the urenone-3 compound thus formed.

By uranone-3 compounds on which this invention may be practiced, I mean derivatives of the parent hydrocarbon urane, which have a carbonyl group at least at $C_3$, and no other substituents in ring A but which may carry at either or both of the positions $C_{11}$ and $C_{20}$ substituents such as carbonyl, hydroxyl, O-acyl and like groups readily convertible to hydroxyl or carbonyl. The parent hydrocarbon urane is an isomer of pregnane and is believed to differ from the latter only in having the opposite configuration at $C_9$.

The mono-halogenation of the uranone-3 compound is preferably conducted in an organic solvent using substantially 1 mole of the halogenating agent. I prefer to conduct this halogenation in an organic solvent inert to elementary halogen under the conditions of reaction. Such organic solvents include the lower aliphatic acids such as acetic acid, propionic acid and butyric acid, and halohydrocarbons such as chloroform, carbon tetrachloride, s-tetrachloroethane and ethylene dichloride. Frequently it is advantageous to use as a catalyst a mineral acid such as hydrochloric acid or hydrobromic acid.

The mono-halogenated uranone-3 compounds have the halogen atom attached to one of the carbon atoms 2 or 4 but I have not been able to determine with certainty their exact structure. It may be that the course of halogenation is determined by the nature of the groups attached to $C_{11}$ and $C_{20}$ for bromouranedione-3,11 behaves as if the bromine atom were at $C_2$, while bromouranedione-3,11,20 behaves as though the bromine atom were at $C_4$. In both instances, however, the compounds are uranone-3 compounds having a halogen atom attached to a carbon atom adjacent to $C_3$.

The elimination of hydrogen halide from the mono-halouranone-3 compounds is accomplished in one or more steps by treatment with a reagent capable of removing hydrogen halide. Such reagents include tertiary organic bases such as triethylamine, pyridine and its higher homologs such as the picolines, the lutidines, and collidines; quinoline, dimethylaniline, and nitrogenous coal tar fractions containing similar organic bases. Other reagents suitable for removing hydrogen halide include substances such as sodium acetate in acetic acid and silver nitrate in pyridine. In general, the procedure employed in removing the elements of hydrohalic acid comprises heating the mono-halogenated uranone-3 compound with the reagent capable of removing hydrohalic acid under conditions of time and temperature sufficiently vigorous to convert most of the halogen into the ionic form. When tertiary bases are employed lesser or greater amounts of quaternary salts are formed along with the desired urenone compound. These quaternary salts are believed to have a structure of the following type, illustrated for the case of the quaternary salt from bromouranedione and pyridine.

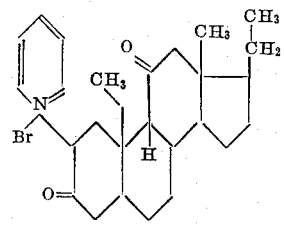

These quaternary salts are readily separated from the urenone compounds because of the solubility of the latter, but not the former, in non-polar organic solvents such as ether, benzene, or ligroin. These quaternary salts may be converted into the urenone compounds by pyrolysis, that is to say, by heating at 100–400° C., preferably in vacuo so as to distil over the urenone-3 compound thus formed.

For separating and purifying the mono-halogenated uranone-3 compounds and the urenone compounds of this invention, recourse may be had to methods such as those illustrated in the examples; or other procedures especially adapted to the properties of the particular compound sought may be used. Such separation and purification procedures include partition between immiscible solvents, fractional crystallization, distillation or sublimation, chromatographic adsorption and like devices.

The new urene compounds of this invention which are unsaturated in ring A have therapeutic activity themselves and they are of value as intermediates in the preparation of other therapeutically active compounds.

In view of the permissible variations set forth above, I do not wish my invention to be limited to a specific embodiment but desire rather that it be construed as broadly as possible in view of the prior art and the appended claims.

What I claim as my invention is:

1. A urenone-3 compound having the structure

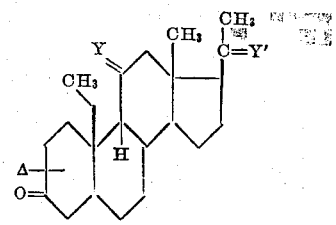

where Y and Y' are members of the class consisting of

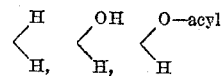

and (=O), and where the symbol Δ represents a carbon-to-carbon double bond in a position of conjugation to the carbonyl group at $C_3$.

2. $\Delta^4$-urenetrione-3,11,20 which exists in allotropic forms having melting points of approximately 196° C. and 212° C. respectively.

3. $\Delta^4$-urenedione-3,11 having a melting point of approximately 168° C. to 170° C.

4. $\Delta^4$-urenedione-3,11-ol-20.

RUSSELL EARL MARKER.